United States Patent
Chu et al.

(10) Patent No.: US 10,694,523 B2
(45) Date of Patent: *Jun. 23, 2020

(54) SPATIAL REUSE TRANSMISSIONS IN WIRELESS LOCAL AREA NETWORKS (WLANS)

(71) Applicant: Marvell World Trade Ltd., St. Michael (BB)

(72) Inventors: Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,016

(22) Filed: Aug. 5, 2019

(65) Prior Publication Data

US 2020/0077404 A1    Mar. 5, 2020

Related U.S. Application Data

(63) Continuation of application No. 15/710,640, filed on Sep. 20, 2017, now Pat. No. 10,375,695.

(Continued)

(51) Int. Cl.
*H04W 72/04* (2009.01)
*H04W 52/24* (2009.01)
(Continued)

(52) U.S. Cl.
CPC ....... *H04W 72/0473* (2013.01); *H04L 5/0007* (2013.01); *H04L 5/0044* (2013.01);
(Continued)

(58) Field of Classification Search
CPC ......... H04W 72/0473; H04W 72/1231; H04W 52/243; H04W 52/247; H04W 52/367;
(Continued)

(56) References Cited

U.S. PATENT DOCUMENTS 9,749,967 B2    8/2017   Wang et al.
10,375,695 B2   8/2019   Chu et al.
(Continued)

FOREIGN PATENT DOCUMENTS

WO    WO-2016/126395 A1    8/2016

OTHER PUBLICATIONS

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

(Continued)

*Primary Examiner* — Mong-Thuy T Tran

(57) ABSTRACT

A first communication device in a first wireless network determines a transmit power for transmitting a first packet during a spatial reuse opportunity corresponding to a transmission in a second wireless network. Determining the transmit power includes using a spatial reuse parameter, indicative of an acceptable interference level in the second wireless network, included in a second packet transmitted by a second communication device in the second wireless network. The first communication device generates the first packet to include information to indicate to a third communication device, that is an intended receiver of the first packet, to not transmit an acknowledgment of the first packet according to a normal acknowledgment procedure during (Continued)

the spatial reuse opportunity. The first communication device transmits the first packet at the determined transmit power, and receives the acknowledgement from the third communication device, the acknowledgement having not been transmitted according to the normal acknowledgment procedure.

20 Claims, 9 Drawing Sheets

Related U.S. Application Data

(60) Provisional application No. 62/396,961, filed on Sep. 20, 2016.

(51) Int. Cl.

| | | |
|---|---|---|
| *H04L 5/00* | (2006.01) | |
| *H04W 52/36* | (2009.01) | |
| *H04W 72/12* | (2009.01) | |
| *H04W 52/50* | (2009.01) | |
| *H04W 52/22* | (2009.01) | |
| *H04W 74/08* | (2009.01) | |
| *H04W 16/14* | (2009.01) | |
| *H04W 52/16* | (2009.01) | |
| *H04W 84/12* | (2009.01) | |

(52) U.S. Cl.
CPC ....... *H04W 52/243* (2013.01); *H04W 52/247* (2013.01); *H04W 52/367* (2013.01); *H04W 52/50* (2013.01); *H04W 72/1231* (2013.01); *H04L 5/0055* (2013.01); *H04W 16/14* (2013.01); *H04W 52/16* (2013.01); *H04W 52/223* (2013.01); *H04W 74/0808* (2013.01); *H04W 84/12* (2013.01)

(58) Field of Classification Search
CPC ... H04W 52/50; H04W 52/16; H04W 52/223; H04W 16/14; H04W 74/0808; H04W 84/12; H04L 5/0007; H04L 5/0044; H04L 5/0055
USPC ......................................................... 370/329
See application file for complete search history.

(56) References Cited

U.S. PATENT DOCUMENTS

| | | |
|---|---|---|
| 2010/0316013 A1 | 12/2010 | Jin |
| 2014/0286203 A1 | 9/2014 | Jindal et al. |
| 2014/0328270 A1 | 11/2014 | Zhu et al. |
| 2016/0302185 A1 | 10/2016 | Sun et al. |
| 2016/0381688 A1 | 12/2016 | Hedayat |
| 2017/0064644 A1* | 3/2017 | Cariou ................ H04W 52/243 |
| 2017/0105217 A1 | 4/2017 | Kwon |
| 2017/0118725 A1 | 4/2017 | Chu et al. |
| 2017/0134975 A1 | 5/2017 | Huang |
| 2017/0347359 A1* | 11/2017 | Yang ................ H04W 72/0473 |

OTHER PUBLICATIONS

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

International Search Report and Written Opinion in International Paent Application No. PCT/US2017/052541, dated Oct. 27, 2017 (12 pages).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

* cited by examiner

SPATIAL REUSE TRANSMISSIONS IN WIRELESS LOCAL AREA NETWORKS (WLANS)

CROSS REFERENCES TO RELATED APPLICATIONS

This application is a continuation of U.S. patent application Ser. No. 15/710,640, now U.S. Pat. No. 10,375,695, entitled "Spatial Reuse Transmissions in Wireless Local Area Networks (WLANS)," filed on Sep. 20, 2017, which claims the benefit of U.S. Provisional Patent Application No. 62/396,961, entitled "Spatial Reuse Discussion," filed on Sep. 20, 2016. All of the applications referenced above are incorporated herein by reference in their entireties.

FIELD OF TECHNOLOGY

The present disclosure relates generally to wireless communication systems, and more particularly to concurrent transmission techniques in proximate wireless networks.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method includes: determining, at a first communication device in a first wireless network, a transmit power for transmitting a first packet during a spatial reuse opportunity corresponding to a transmission in a second wireless network, wherein determining the transmit power includes using a spatial reuse parameter included in a second packet transmitted by a second communication device in the second wireless network, wherein the spatial reuse parameter is indicative of an acceptable interference level in the second wireless network; generating, at a first communication device, the first packet to include information to indicate to a third communication device that the third communication device should not transmit a third packet according to a normal acknowledgment procedure during the spatial reuse opportunity, wherein the third communication device is an intended receiver of the first packet, and wherein the third packet is an acknowledgment of the first packet; transmitting, by the first communication device, the first packet at the determined transmit power; and receiving, at the first communication device, the third packet from the third communication device, the third packet having not been transmitted according to the normal acknowledgment procedure during the spatial reuse opportunity.

In another embodiment, an apparatus comprises a network interface device associated with a first communication device in a first wireless network. The network interface device includes one or more integrated circuits (ICs) configured to: determine a transmit power for transmitting a first packet during a spatial reuse opportunity corresponding to a transmission in a second wireless network, wherein determining the transmit power includes using a spatial reuse parameter included in a second packet transmitted by a second communication device in the second wireless network, wherein the spatial reuse parameter is indicative of an acceptable interference level in the second wireless network, generate the first packet to include information to indicate to a third communication device that the third communication device should not transmit a third packet according to a normal acknowledgment procedure during the spatial reuse opportunity, wherein the third communication device is an intended receiver of the first packet, and wherein the third packet is an acknowledgment of the first packet, transmit the first packet at the determined transmit power, and receive the third packet from the third communication device, the third packet having not been transmitted according to the normal acknowledgment procedure during the spatial reuse opportunity.

In still another embodiment, a method includes: receiving, at a first communication device in a first wireless network, a first packet from a second communication device in the first wireless network; determining, at the first communication device, that the first packet was transmitted during a spatial reuse opportunity corresponding to a transmission in a second wireless network; generating, at the first communication device, a second packet that is an acknowledgment of the first packet; and in response to determining that the first packet was transmitted during the spatial reuse opportunity corresponding to the transmission in the second wireless network, transmitting the second packet according to a procedure that is not a normal acknowledgment procedure, including at least one of: i) performing a clear channel assessment (CCA) procedure to determine whether a communication channel is idle, and transmitting the second packet responsive to determining that the communication channel is idle, and/or ii) transmitting the second packet at a transmit power that is lower than a normal transmit power.

In yet another embodiment, an apparatus comprising a network interface device associated with a first communication device in a first wireless network. The network interface device includes one or more integrated circuits (ICs) configured to: receive a first packet from a second communication device in the first wireless network, determine that the first packet was transmitted during a spatial reuse opportunity corresponding to a transmission in a second wireless network, generate a second packet that is an acknowledgment of the first packet, and in response to determining that the first packet was transmitted during the spatial reuse opportunity corresponding to the transmission in the second wireless network, transmit the second packet according to a procedure that is not a normal acknowledgment procedure, including at least one of: i) performing a clear channel assessment (CCA) procedure to determine whether a communication channel is idle, and transmitting the second packet responsive to determining that the communication channel is idle, and/or ii) transmitting the second packet at a transmit power that is lower than a normal transmit power.

DETAILED DESCRIPTION

To promote more efficient use of a channel medium when two wireless networks are operating in proximity, a first communication device in a first wireless network is permitted to transmit, under certain conditions, a packet to a second communication device in the first wireless network while a transmission in a second wireless network is occurring. For example, the first communication device may transmit the packet at a reduced transmit power level to avoid interfering with the transmission in the second wireless network. Typically, the second communication device in the first wireless network will automatically transmit an acknowledgment (ACK) to the first communication device a defined time period after the end of the packet. However, if the second communication device is located closer to the second wireless network than the first communication device, the ACK from the second communication device may interfere with the transmission in the second wireless network even though the packet from the first communication device did not. Various embodiments described below provide example techniques for avoiding transmission of an ACK that interferes with a concurrent transmission in a neighboring wireless network.

Figure 1:
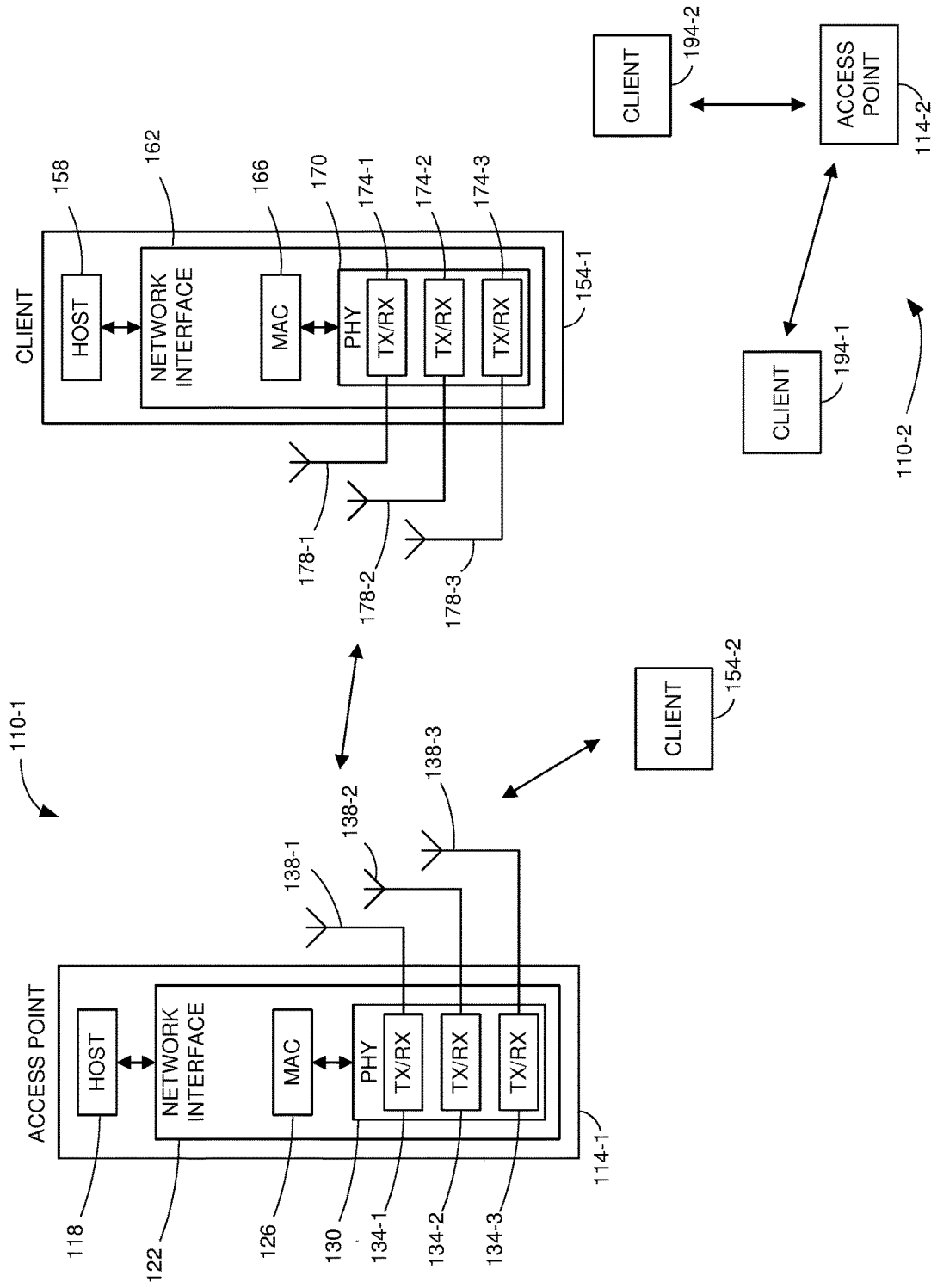
FIG. 1 is a block diagram of an example system having multiple wireless local area networks (WLANs), according to an embodiment.

FIG. 1 is a block diagram of an example communication system including multiple WLANs 110, according to an embodiment. A first WLAN 110-1 includes an access point (AP) 114-1 that comprises a host processor 118 coupled to a network interface device 122. The network interface 122 includes a medium access control layer (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114-1 includes other suitable numbers (e.g., 1, 2, 4, 5, etc.) of transceivers 134 and antennas 138 in other embodiments. In some embodiments, the AP 114-1 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114-1 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC data units such as MAC service data units (MSDUs), MAC protocol data units (MPDUs), etc., and provide the MAC data units to the PHY processor 130. The PHY processor 130 may be configured to receive MAC data units from the MAC processor 126 and encapsulate the MAC data units to generate PHY data units such as PHY protocol data units (PPDUs) for transmission via the antennas 138. Similarly, the PHY processor 130 may be configured to receive PHY data units that were received via the antennas 138, and extract MAC data units encapsulated within the PHY data units. The PHY processor 130 may provide the extracted MAC data units to the MAC processor 126, which processes the MAC data units.

The WLAN 110-1 includes a plurality of client stations 154. Although two client stations 154 are illustrated in FIG. 1, the WLAN 110-1 includes other suitable numbers (e.g., 1, 3, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC functions, including MAC functions of the WLAN communication protocol, and the PHY processor 170 may be configured to implement PHY functions, including PHY functions of the WLAN communication protocol. The MAC processor 166 may be configured to generate MAC data units such as MSDUs, MPDUs, etc., and provide the MAC data units to the PHY processor 170. The PHY processor 170 may be configured to receive MAC layer data units from the MAC processor 166 and encapsulate the MAC data units to generate PHY data units such as PPDUs for transmission via the antennas 178. Similarly, the PHY processor 170 may be configured to receive PHY data units that were received via the antennas 178, and extract MAC data units encapsulated within the PHY data units. The PHY processor 170 may provide the extracted MAC data units to the MAC processor 166, which processes the MAC data units.

In an embodiment, the client station 154-2 has a structure that is the same as or similar to the client station 154-1. The client station 154-2 structured the same as or similar to the client station 154-1 has the same or a different number of transceivers and antennas. For example, the client station 154-2 has only two transceivers and two antennas (not shown), according to an embodiment.

The system illustrated in FIG. 1 also includes a WLAN 110-2. The WLAN 110-2 includes an AP 114-2 and a plurality of client stations 194. In an embodiment, the AP 114-2 has a structure that is the same as or similar to the AP 114-1. The AP 114-2 structured the same as or similar to the AP 114-1 has the same or a different number of transceivers and antennas. For example, the AP-2 has only two transceivers and two antennas (not shown), according to an embodiment.

In an embodiment, the client stations 194 each have a respective structure that is the same as or similar to the client station 154-1. Each client station 194 structured the same as or similar to the client station 154-1 has the same or a different number of transceivers and antennas. For example, the client station 194-1 has only two transceivers and two antennas (not shown), according to an embodiment.

Although two client stations 194 are illustrated in FIG. 1, the WLAN 110-2 includes other suitable numbers (e.g., 1, 3, 4, 5, 6, etc.) of client stations 194 in various scenarios and embodiments.

Wireless networks such as the networks 110 are sometimes referred to as basic service sets (BSSs). When transmissions from one BSS are received by devices in another BSS, and vice versa, the BSSs are sometimes referred to as overlapping BSSs (OBSSs). For example, in one scenario, the network 110-2 is an OBSS with respect to the network 110-2, and vice versa.

In an embodiment, the APs 114 and the client stations 154/194 contend for a communication medium using carrier sense multiple access with a collision avoidance (CSMA/CA) protocol or another suitable medium access protocol. In an embodiment, the APs 114 and the client stations 154/194 employ a clear channel assessment (CCA) procedure, in which the AP/client station determines an energy level of the medium in order to determine whether the medium is busy or idle. Generally speaking, if the energy level indicates the medium is idle, the device can transmit. On the other hand, if the energy level indicates the medium is busy, the device sets a backoff counter. The backoff counter is decremented during a time slot if the energy level of the medium indicates the medium is idle, and not decremented during the time slot if the energy level of the medium indicates the medium is busy. When the backoff counter reaches zero and if the energy level of the medium indicates the medium is idle, the device can transmit.

A threshold energy level for determining whether the medium is idle or busy may depend upon the bandwidth of the channel being used by the device and on whether the energy corresponds to a transmission that conforms to the wireless communication protocol. For example, in the IEEE 802.11 Standard, if the channel bandwidth is 20 Megahertz (MHz), the threshold level is −82 decibel-milliwatts (dBm) for energy from valid 802.11 transmissions. For channel bandwidths of 40 MHz, 80 MHz, and 160 MHz, the threshold levels are −79 dBm, −76 dBm, and −73 dBm, respectively. Using these threshold levels for CCA is sometimes referred to herein as a "static CCA" procedure. These threshold levels are sometimes referred to herein as "default threshold levels". For energy not identified by the device as a valid 802.11 signal, the threshold level is −62 dBm.

In accordance with the CSMA/CA protocol discussed above, a communication device (e.g., one of the stations 154) within the network 110-1 will generally not be permitted to transmit while another communication device within the network 110-1 is transmitting (sometimes referred to as a same-BSS or intra-BSS transmission). However, as will be discussed below, if a communication device in the network 110-1 determines that a transmission is from another network (e.g., the network 110-2) (sometimes referred to as an OBSS or inter-BSS transmission), the communication device in the network 110-1 will, if certain conditions are satisfied, be permitted to transmit during the OBSS transmission. Such a transmission is referred to herein as a spatial reuse (SR) transmission. As will be described below, the transmit power of an SR transmission in the network 110-1 is reduced (e.g., as compared to a non SR transmission) to mitigate degradation of the transmission in the network 110-2.

In order for a communication device that is compliant with a communication protocol (e.g., the IEEE 802.11ax protocol, now under development, or another suitable wireless communication protocol) to determine whether a given transmission corresponds to a same-BSS or to an OBSS, the device may obtain a BSS color from a PHY header (e.g., within a high efficiency signal field A (HE-SIGA)) in the transmission, and compare the BSS color in the PHY header to a color of the BSS to which the device belongs. A BSS color is an identifier of a wireless network, according to an embodiment. In some embodiments, AP1 chooses a BSS color for the network 110-1 and communicates the chosen BSS color to client stations 154 within the network 110-1 (e.g., via beacon frames, control frames, etc.).

Thus, if communication device determines that a BSS color in a PHY header of a packet is the same as a BSS color of the wireless network to which the communication belongs, the communication device concludes that the packet corresponds to is a same-BSS transmission. On the other hand, if the BSS color in the PHY header of the packet is different than the BSS color of the wireless network to which the communication belongs, then the communication device concludes that the packet corresponds to an OBSS transmission. If the packet corresponds to an OBSS transmission, the communication device may determine whether conditions for an SR transmission are or can be satisfied, in some embodiments.

In another embodiment, the communication device analyzes one or more MAC address fields in the MAC header of the packet to decide whether the received frame is from the same BSS. For example, one or more MAC address fields in the MAC header include the BSSID of the BSS to which the packet belongs, at least in some scenarios. Thus, in an embodiment, when a client station detects a packet, the client station compares i) a MAC address field, in the MAC header of the packet, that carries the BSSID, with ii) the BSSID of the BSS to which the client station belongs. If the BSSID in the MAC address field of the MAC header is the same as the BSSID of the BSS to which the client station belongs, the client station determines that the detected frame is from the same-BSS. On the other hand, if none of the one or more MAC address fields, in the MAC header, that carry the BSSID are the same as the BSSID of the BSS to which the client station belongs, the client station determines that the detected frame is from an OBSS.

Figure 2:
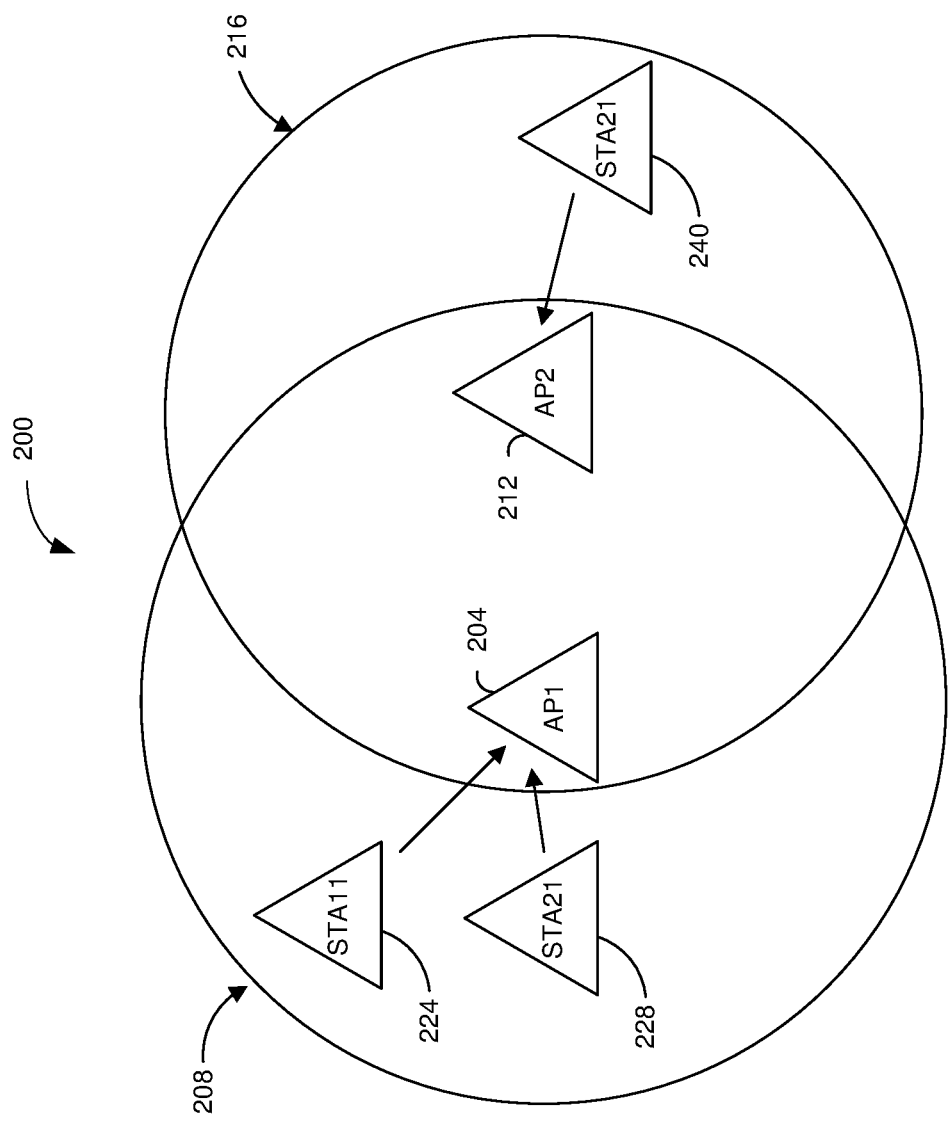
FIG. 2 is a diagram of an example communication system that includes two wireless networks with overlapping coverage areas.

FIG. 2 is a diagram of another example communication system 200 that includes a first AP (AP1) 204 that serves a first network (BSS1) with a coverage area 208. The communication system 200 also includes a second AP (AP2) 212 that serves a second network (BSS2) having a second coverage area 216. BSS2 is an OBSS to BSS1, and vice versa.

The first AP 204 and/or the second AP 212 have a structure the same as or similar to the example AP 114-1 in FIG. 1, in an embodiment. In other embodiments, the first AP 204 and/or the second AP 212 have a different suitable structure.

BSS1 includes a client station 224 (STA11) and a client station 228 (STA12). The client station 224 and/or the client station 228 have a structure the same as or similar to the example client station 154-1 in FIG. 1, in an embodiment. In other embodiments, the client station 224 and/or the client station 228 have a different suitable structure.

BSS2 includes a client station 240 (STA21). The client station 240 has a structure the same as or similar to the example client station 154-1 in FIG. 1, in an embodiment. In other embodiments, the client station 240 has a different suitable structure.

In an example scenario depicted in FIG. 2, STA11 and STA12 are participating in an uplink (UL) multi-user (MU) transmission in which a plurality of client stations (including STA11 and STA12) transmit simultaneously to AP1. For example, an UL MU transmission may employ orthogonal frequency division multiple access (OFDMA) or MU multiple input, multiple output (MU-MIMO) techniques, in some embodiments.

Figure 3:
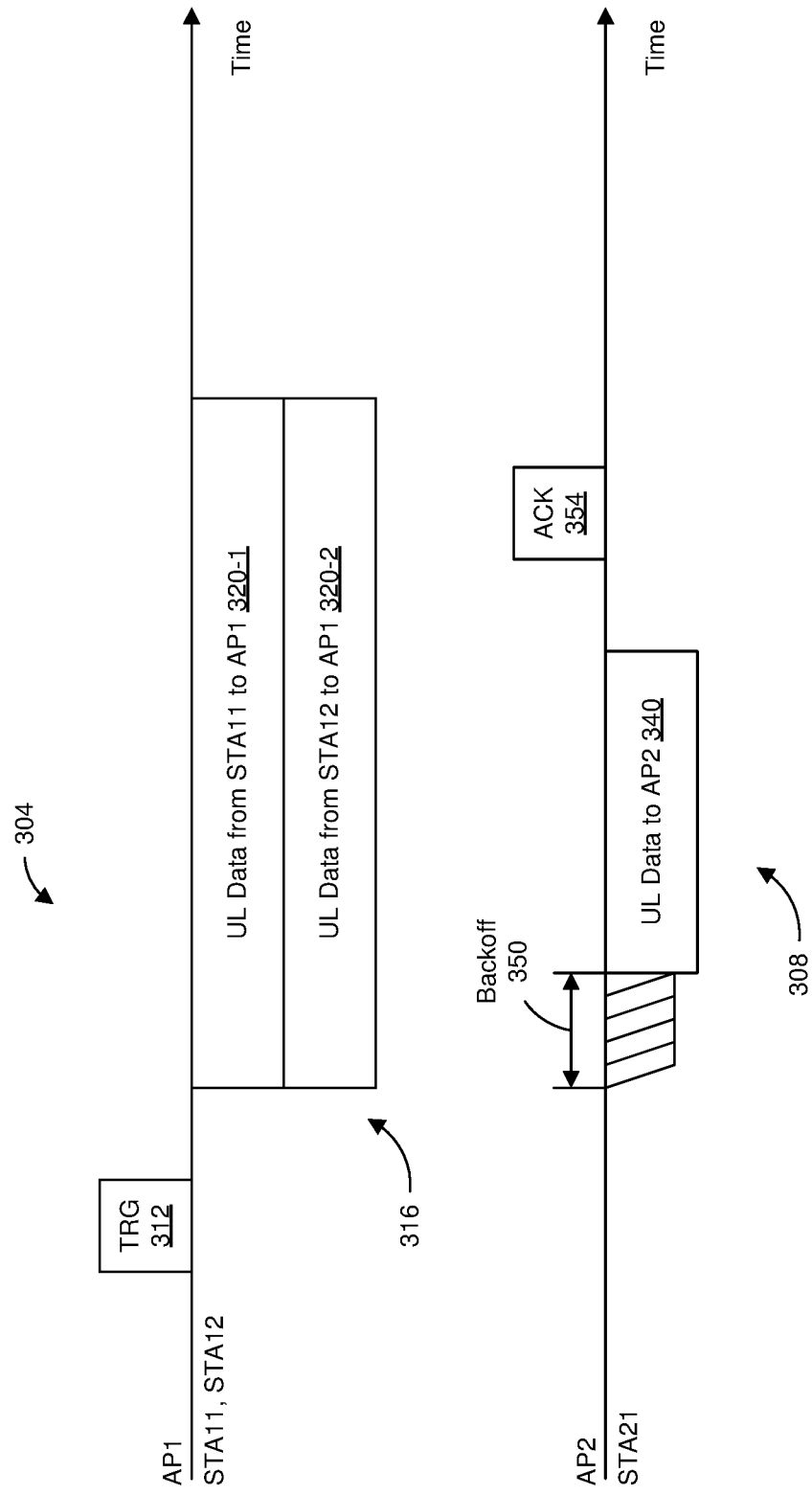
FIG. 3 is a timing diagram of example transmissions in the communication system of FIG. 2, according to an embodiment.

FIG. 3 is a timing diagram of transmissions in the system 200 of FIG. 2. For example, transmissions 304 are made by communication devices in BSS1, whereas transmissions 308 are made by communication devices in BSS2.

AP1 generates and transmits a trigger frame 312 that prompts STA11 and STA12 to generate an uplink multi-user (UL MU) PHY data unit 316 (e.g., an UL MU PPDU). The UL MU PHY data unit 316 includes respective UL transmissions 320 from STA11 and STA12. As used herein, the term "frame" refers to a MAC data unit such as an MPDU, an A-MPDU, an MSDU, etc. Thus, the trigger frame 312 is included in a PHY data unit (e.g., a PPDU) prior to transmission.

To facilitate SR transmissions in other networks, the trigger frame 312 and the UL transmissions 320 include various information for communication devices in other networks to use in determining whether an SR transmission can be performed, and/or to adjust a transmit power level for an SR transmission to reduce or mitigate degradation of reception of the UL MU PHY data unit 316 in BSS1 by AP1.

For example, the trigger frame 312 includes a spatial reuse parameter (SRP) which is generally indicative of an acceptable level of interference that the AP1 can tolerate when the AP1 is receiving. In an embodiment, STA21 can use the SRP to determine a maximum transmit power that STA21 can use for an SR transmission ($TXpower_{SR,max}$) during the UL MU PHY data unit 316. In an illustrative embodiment, $TXpower_{SR,max}$ corresponds to:

$$TXpower_{SR,max} = Interference_{accept} + Path\_loss \quad \text{Equation 1}$$

where $Interference_{accept}$ is the acceptable level of interference that the AP1 can tolerate when the AP1 is receiving, and Path_loss is a signal attenuation from STA21 to AP1. Path_loss can be determined as:

$$Path\_loss = TXpower_{AP1} - RSSI_{STA21} \quad \text{Equation 2}$$

where $TXpower_{AP1}$ is a transmit power used by AP1 when transmitting the trigger frame 312, and $RSSI_{STA21}$ is a received signal strength corresponding to the trigger frame 312 as measured at STA21. Thus, Equation 1 can be rewritten as:

$$TXpower_{SR,max} = Interference_{accept} + TXpower_{AP1} - RSSI_{STA21} \quad \text{Equation 3}$$

In an embodiment, AP1 determines the SRP parameter as:

$$SRP = Interference_{accept} + TXpower_{AP1} \quad \text{Equation 4}$$

Thus, Equation 3 can be rewritten as:

$$TXpower_{SR,max} = SRP - RSSI_{STA21} \quad \text{Equation 5}$$

As discussed above, the trigger frame 312 includes SRP. Additionally, the trigger frame 312 includes a BSS color parameter, and an indication of a duration of the UL MU PHY data unit 316, e.g., in respective fields of the trigger frame 312.

AP1 transmits the trigger frame 312 (e.g., within a DL MU PPDU), which is received by STA11, STA12, and STA21. STA21 (e.g., the PHY processor 170 of the network interface device 162) measures a received signal strength ($RSSI_{STA21}$) of the DL MU PPDU, which includes the trigger frame 312. In an embodiment, upon STA21 receiving the trigger frame 312, STA21 determines the SRP, the BSSID, and the value indicating the duration of the UL MU PHY data unit 316 from the signal fields in the trigger frame 312. Using the SRP and the measured $RSSI_{STA21}$, STA21 calculates $TXpower_{SR,max}$ according to Equation 5, for example. Additionally, STA21 calculates a duration of an SR transmission opportunity ($Duration_{SR\_opp}$) using the value indicating the duration of the UL MU PHY data unit 316. In an embodiment, AP2 can also calculate $TXpower_{SR,max}$ and/or $Duration_{SR\_opp}$ in a similar manner in connection with a downlink SR transmission, e.g., to STA21 and/or to another client station associated with AP2.

In an embodiment, in connection with receiving the trigger frame 312, STA11 and STA12 generate respective PPDUs (referred to herein as UL PPDUs 320) corresponding to the UL transmissions 320. Each UL PPDU 320 includes a PHY header with a signal field (e.g., HE-SIGA), with subfields corresponding to SRP, BSS color, and an indication of a duration of the UL MU PHY data unit 316. For example, STA11 and STA12 populate SRP subfields in the UL PPDUs 320 with the SRP value included in the trigger frame 312. Additionally, STA11 and STA12 populate BSS color subfields in the UL PPDUs 320 with the BSS color corresponding to BSS1. Additionally, STA11 and STA12 populate duration subfields in the UL PPDUs 320 with a value indicating the duration of the UL MU PHY data unit 316.

STA11 and STA12 transmit the UL PPDUs 320, which correspond the UL MU PHY data unit 316. Upon receiving STA21 receiving the UL MU PHY data unit 316, STA21 determines the SRP, the BSS color, and the value indicating the duration of the UL MU PHY data unit 316 from the signal fields in the UL MU PHY data unit 316. Using the SRP and the measured $RSSI_{ST421}$, STA21 calculates $TXpower_{SR,max}$ according to Equation 5, for example. Additionally, STA21 calculates a duration of an SR transmission opportunity ($Duration_{SR\_opp}$) using the value indicating the duration of the UL MU PHY data unit 316.

If STA21 determines that i) $Duration_{SR\_opp}$ is sufficient for an UL transmission by STA21, and ii) that STA21 can use a transmit power less than $TXpower_{SR,max}$ for the UL transmission by STA21, then STA21 generates an UL PHY data unit 340, and performs a backoff procedure 350. If performance of the backoff procedure indicates that the STA21 can transmit, then STA21 transmits the UL PHY data unit 340 to AP2. A procedure to determine whether an SR transmission can be made such as described above is sometimes referred to as "opportunistic adaptive CCA" or "OA-CCA", and an SR transmission performed in accordance with OA-CCA is sometimes referred to an OA-CCA transmission.

Typically, in response to AP2 receiving any PHY data unit addressed to AP2, AP2 will transmit an acknowledgment PHY data unit (ACK) 354 a defined time period after the end of PHY data unit without first performing a CCA assessment and/or without first assessing whether the channel medium is idle (sometimes referred to herein as a "transmitting according to a normal acknowledgment procedure"). Thus, in response to AP2 receiving the UL PHY data unit 340, AP2 will transmit ACK 354 back to STA21 the defined time period after the end of UL PHY data unit 340. If AP2 is located more closely to AP1 than STA21 (as depicted in FIG. 2), however, transmission of ACK 354 may interfere with AP1's reception of UL MU PHY data unit 316, i.e., ACK 354 "collides" with UL MU PHY data unit 316.

Thus, in some embodiments described below, AP2 does not transmit the ACK 354 according to the normal acknowledgment procedure.

Figure 4:
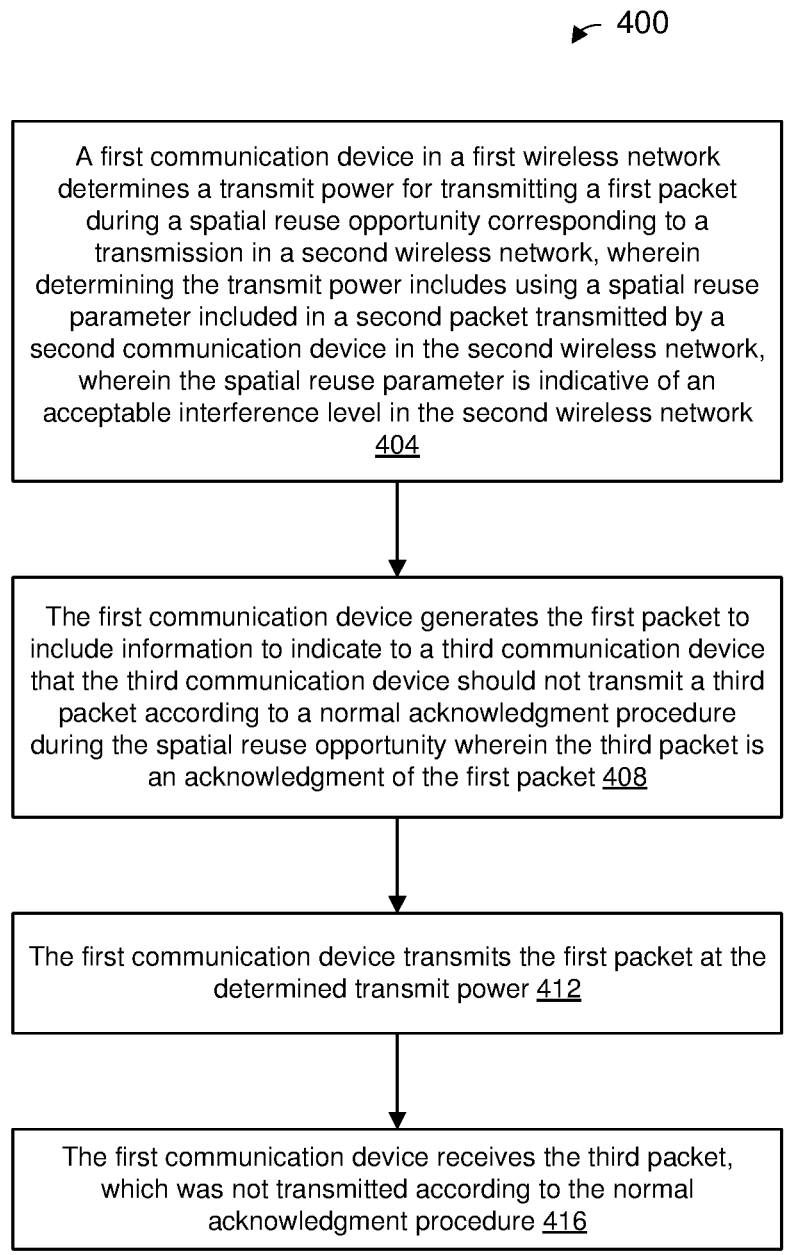
FIG. 4 is a flow diagram of an example method for transmitting a packet during a spatial reuse transmission opportunity such that a receiving device does not transmit an acknowledgment (ACK) according to a normal acknowledgment procedure, according to an embodiment.

FIG. 4 is a flow diagram of an example method 400 for transmitting a packet during a spatial reuse transmission opportunity such that a receiving device does not transmit an ACK according to the normal acknowledgment procedure, according to an embodiment. In some embodiments, the network interface device 162 of FIG. 1 is configured to implement the method 400, and the method 400 is described with reference to FIG. 1 merely for explanatory purposes. FIG. 4 is described also with reference to FIG. 3 merely for explanatory purposes. In other embodiments, however, the method 400 is implemented by another suitable device different than the example devices of FIG. 1 and/or in connection with other types of transmissions different that the example scenario depicted in FIG. 3. Similarly, in some embodiments, the network interface device 162 of FIG. 1 is not configured to implement the method 400.

At block 404, a first communication device (e.g., the network interface device 162 of FIG. 1, STA21 of FIG. 3) in a first wireless network (e.g., the network 110-1) determines a transmit power for transmitting a first packet during a spatial reuse opportunity corresponding to a transmission in a second wireless network (e.g., the network 110-2). In an embodiment, block 404 includes using a spatial reuse parameter included in a second packet transmitted by a second communication device in the second wireless network, wherein the spatial reuse parameter is indicative of an acceptable interference level in the second wireless network.

For example, in an embodiment, the transmission in the second wireless network corresponds to an UL MU transmission prompted by a trigger frame. In an embodiment, the spatial reuse parameter is included in a second packet that includes the trigger frame (e.g., trigger frame 312 of FIG. 3) and is transmitted by an AP (e.g., AP 114-2 of FIG. 1, AP1 of FIG. 3) in the second network. In another embodiment, the spatial reuse parameter is included in an UL data transmission (e.g., UL data transmission 320 in UL MU PPDU 316 of FIG. 3) responsive to a trigger frame, and is transmitted by a client station (e.g., client station 194 of FIG. 1, STA11 and/or STA12 of FIG. 3) in the second network.

At block 408, the first communication device (e.g., the network interface device 162 of FIG. 1, STA21 of FIG. 3) generates the first packet to include information to indicate to a third communication device (e.g., AP 114-1 of FIG. 1, AP2 of FIG. 3) that the third communication device should not transmit a third, acknowledgment packet according to a normal acknowledgment procedure during the spatial reuse opportunity, wherein the third communication device is an intended receiver of the first packet.

In an embodiment, the normal acknowledgment procedure corresponds to transmitting an ACK (e.g., ACK 354, which may be an Ack, a compressed Block Ack (BA), a multi-STA BA, or other suitable acknowledgement frame) a defined time period after an end of a PHY data unit that is being acknowledged (e.g., UL PPDU 340) without first performing a CCA assessment and/or without first assessing whether the channel medium is idle. Additionally, the normal acknowledgment procedure corresponds to transmitting the ACK (e.g., ACK 354) at a normal transmit power level which is a higher power level than the third communication device would use when the third communication device is transmitting a spatial reuse transmission, according to another embodiment.

In an embodiment, the information that indicates to the third communication device that the third communication device should not transmit the third, acknowledgment packet according to the normal acknowledgment procedure during the spatial reuse opportunity includes an indicator in a field of a header (e.g., a MAC header, a PHY header, etc.) of the first packet, the indicator indicating that the first packet is being transmitted during a spatial reuse opportunity corresponding to a transmission in the second wireless network. In an embodiment, the information to indicate to a third communication device that the third communication device should not transmit an acknowledgment packet according to a normal acknowledgment procedure is in an HE variant Control field in a MAC header. For example, the HE variant Control field includes one or more control subfields, each including i) a control identifier (ID) that indicates a type of control information included in the control subfield, and ii) the control information. Thus, in an embodiment, a network interface device (e.g., a MAC processor) generates a HE variant Control field with a control subfield having i) a control ID set to indicate that the control subfield includes information to indicate whether a third communication device should not transmit an acknowledgment packet according to a normal acknowledgment procedure, and ii) control information that includes information to indicate to a third communication device that the third communication device should not transmit an acknowledgment packet according to a normal acknowledgment procedure. As will be described below, the third communication device, upon receiving the first packet and determining that the first packet includes the indicator, refrains from transmitting the third, acknowledgment packet using the normal acknowledgment procedure. For example, in an embodiment, the third communication device uses a CCA procedure to determine whether the communication channel is idle and does not transmit the third, acknowledgment packet until determining that the communication is idle. As another example, the third communication device uses a spatial reuse procedure to determine a reduced transmit power at which to transmit the third, acknowledgment packet, according to another embodiment.

In another embodiment, the information that indicates to the third communication device that the third communication device should not transmit the third, acknowledgment packet according to the normal acknowledgment procedure during the spatial reuse opportunity includes an indicator in a field of a header (e.g., a MAC header, a PHY header, etc.) of the first packet that the first packet should be acknowledged using a block acknowledgment procedure and in response to a subsequent block acknowledgment request transmitted by the first communication device. For example, block 408 includes generating a MAC header, within the first packet, that includes an acknowledgment policy subfield set with a value to indicate that the first packet should be acknowledged using a block acknowledgment (BA) procedure in which the first communication device subsequently requests the third communication device to transmit BA information. As will be described below, the third communication device, upon receiving the first packet and determining that the first packet includes the indicator that the first packet should be acknowledged using a BA procedure, refrains from transmitting the third, acknowledgment packet using the normal acknowledgment procedure. For example, in an embodiment, the third communication device waits for the first communication device to prompt the third communication device with a subsequent fourth packet (e.g., that includes a BA request frame) to transmit the third, acknowledgment packet.

At block 412, the first communication device (e.g., the network interface device 162 of FIG. 1, STA21 of FIG. 3) transmits the first packet to the third communication device (e.g., the e.g., AP 114-1 of FIG. 1, AP2 of FIG. 3) at the transmit power determined at block 404.

At block 416, the first communication device (e.g., the network interface device 162 of FIG. 1, STA21 of FIG. 3) receives the third, ACK packet from the third communication device (e.g., the e.g., AP 114-1 of FIG. 1, AP2 of FIG. 3), wherein the third, ACK packet was not transmitted by the third communication device using the normal ACK procedure. For example, the third communication device does not begin transmitting the third, ACK packet within a time period defined by a communication protocol for transmitting ACK packets, the time period corresponding to the fixed time period after the end of the first communication device. Rather, the third communication device begins transmitting the third, ACK packet at a time, after the time period defined by the communication protocol, at which the third communication device determined that the communication channel became idle.

As another example, the third communication device does not transmit the third, ACK packet at a normal transmit power level, but rather uses a reduced transmit power level, according to another embodiment. As yet another example, the third communication device waits for the first communication device to prompt the third communication device with a subsequent fourth packet (e.g., that includes a BA request frame) to transmit the third, acknowledgment packet, according to another embodiment.

Figure 5:
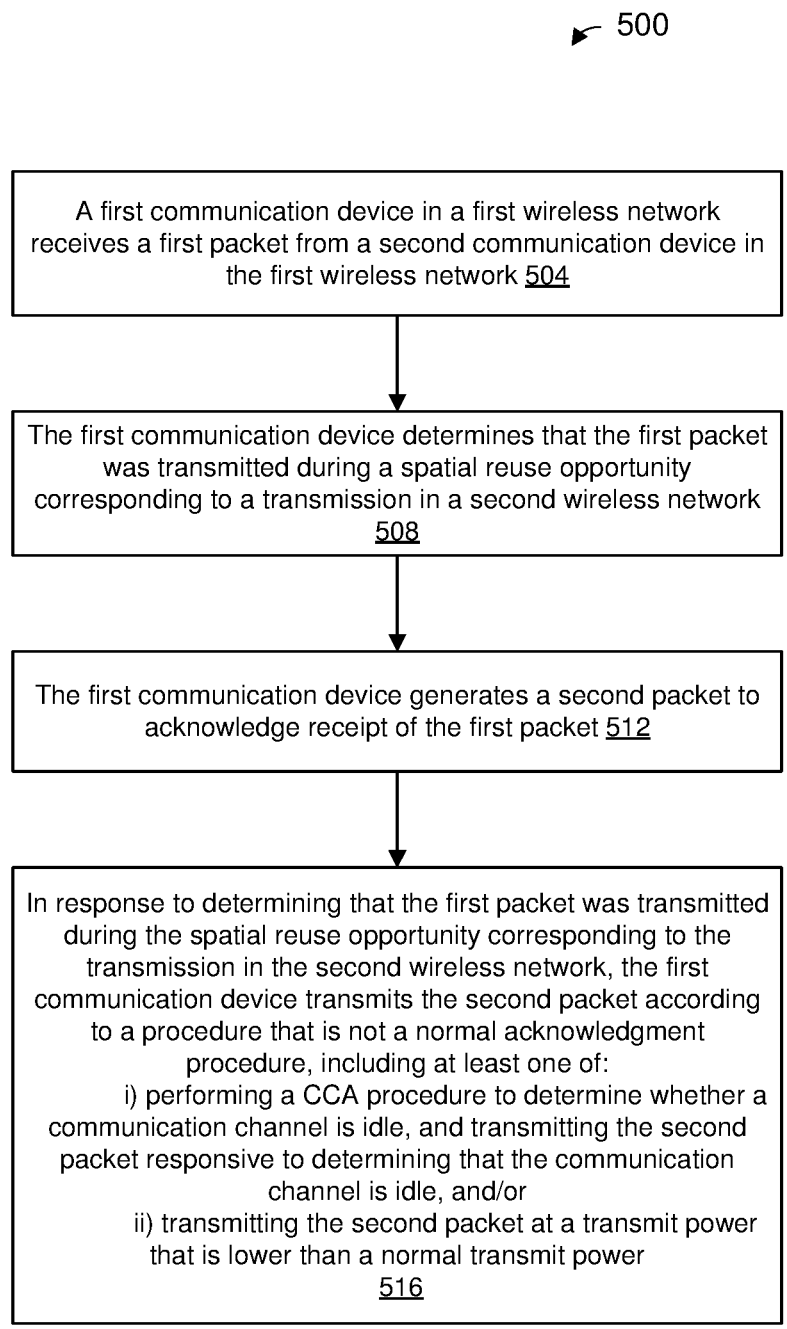
FIG. 5 is a flow diagram of an example method for transmitting an ACK, according to an embodiment.

FIG. 5 is a flow diagram of an example method 500 for transmitting an ACK packet, according to an embodiment. In some embodiments, the network interface device 122 of FIG. 1 is configured to implement the method 500, and the method 500 is described with reference to FIG. 1 merely for explanatory purposes. FIG. 5 is described also with reference to FIG. 3 merely for explanatory purposes. In other embodiments, however, the method 500 is implemented by another suitable device different than the example devices of FIG. 1 and/or in connection with other types of transmissions different that the example scenario depicted in FIG. 3. Similarly, in some embodiments, the network interface device 122 of FIG. 1 is not configured to implement the method 500.

At block 504, a first communication device (e.g., the network interface device 122 of FIG. 1, AP2 of FIG. 3) in a first wireless network (e.g., the network 110-1) receives a first packet from a second communication device (e.g., the network interface device 162 of FIG. 1, STA21 of FIG. 3) in a first wireless network (e.g., the network 110-1).

At block 508, the first communication device (e.g., the network interface device 162 of FIG. 1, STA21 of FIG. 3) determines that the first packet was transmitted during a spatial reuse opportunity corresponding to a transmission in a second wireless network (e.g., the network 110-2). In an embodiment, the first packet includes spatial reuse information that indicates that the first packet was transmitted during a spatial reuse opportunity corresponding to a transmission in a second wireless network, and block 508 includes analyzing the spatial reuse information to determine that the first packet was transmitted during a spatial reuse opportunity corresponding to a transmission in a second wireless network.

In another embodiment, block 508 includes analyzing information in one or more other packets transmitted by other communication devices in the second wireless network to determine that the first packet was transmitted during a spatial reuse opportunity. For example, in an embodiment, the transmission in the second wireless network corresponds to an UL MU transmission prompted by a trigger frame. In an embodiment, the first communication device analyzes information in one or both of the trigger frame and the UL MU transmission in the second wireless network, such as a spatial reuse parameter (e.g., as described above), duration information that indicates a duration of the UL MU transmission, etc.

At block 512, the first communication device (e.g., the network interface device 122 of FIG. 1, AP2 of FIG. 3) generates a second packet to acknowledge receipt of the first packet.

At block 516, in response to determining that the first packet was transmitted during the spatial reuse opportunity corresponding to the transmission in the second wireless network, the first communication device (e.g., the network interface device 122 of FIG. 1, AP2 of FIG. 3) transmits the second packet according to a procedure that is not a normal acknowledgment procedure. In an embodiment, block 516 includes not transmitting the second, ACK packet within a time period defined by a communication protocol for transmitting ACK packets, the time period corresponding to the fixed time period after the end of the first communication device, but rather beginning to transmit the second, ACK packet at a time, after the time period defined by the communication protocol, at which the first communication device determines that the communication channel became idle, e.g., using a CCA procedure.

In another embodiment, block 516 additionally or alternatively includes transmitting the second packet at a transmit power that is lower than a normal transmit power. For example, the first communication device uses a procedure, similar to the procedure discussed above with reference to FIG. 3 and in connection with transmitting the packet 340, to determine a reduced transmit power to use during the spatial reuse opportunity, and uses the reduced transmit power to transmit the second, ACK packet.

In an embodiment, if the first communication device does not determine that the first packet was transmitted during a spatial reuse opportunity (e.g., in connection to block 508), the first communication device uses a normal acknowledgment procedure to transmit the second, ACK packet, and block 516 is not performed.

In some embodiments, a communication device that is to transmit during a spatial reuse opportunity first uses a request-to-send (RTS), clear-to-send (CTS) procedure to determine whether the intended recipient detects an idle communication channel during the spatial reuse opportunity.

Figure 6:
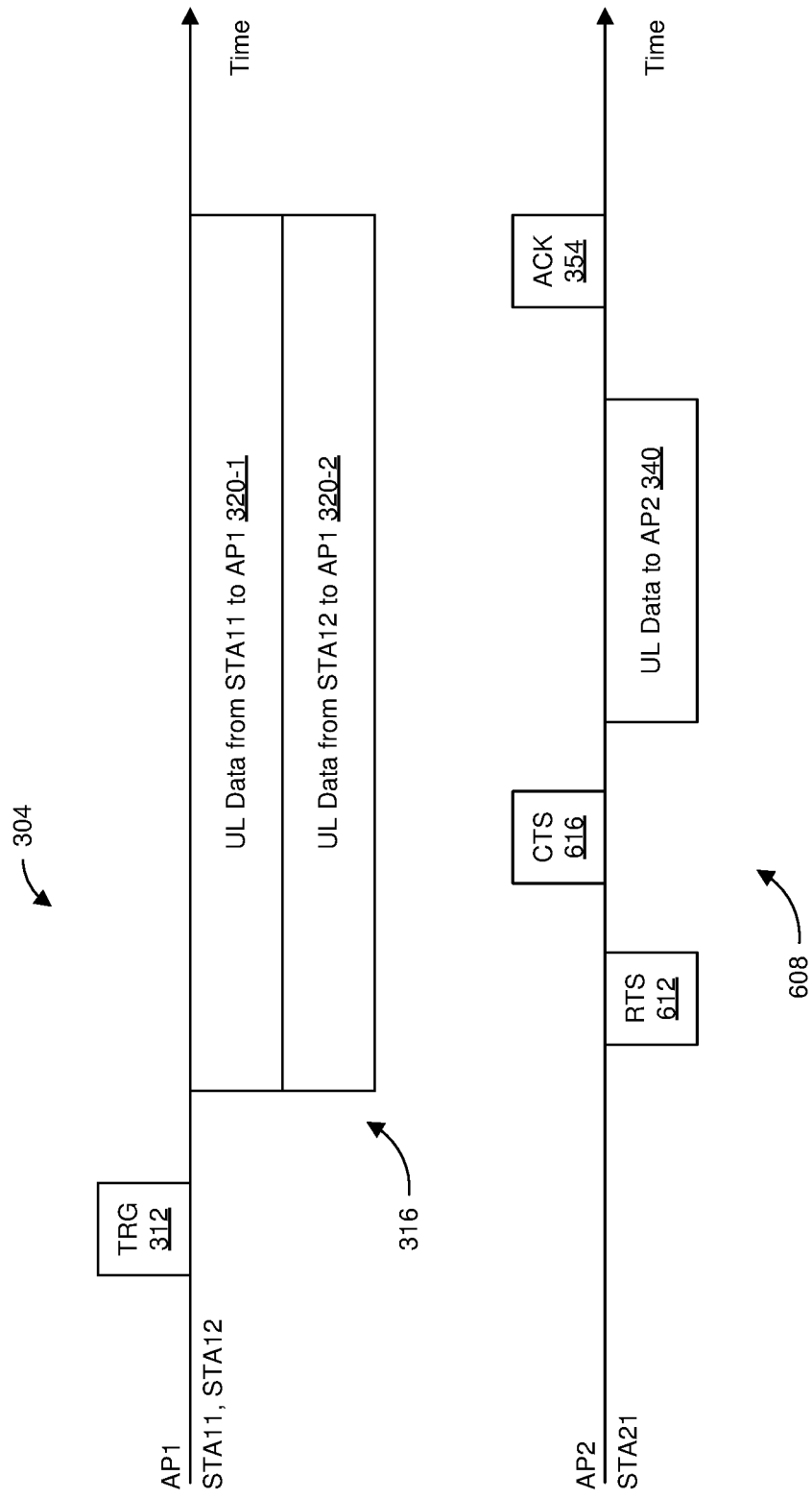
FIG. 6 is a timing diagram of example transmissions in the communication system of FIG. 2, according to an embodiment.

FIG. 6 is a timing diagram of transmissions in the system 200 of FIG. 2. The transmissions shown in FIG. 6 are similar to the transmissions shown in FIG. 3, and like-numbered elements are not discussed in detail for purpose of brevity. Transmissions 304 are made by communication devices in BSS1, whereas transmissions 608 are made by communication devices in BSS2.

Similar to the example discussed above with respect to FIG. 2, STA21 determines to attempt a spatial reuse transmission of a data packet during transmission 316 of BSS1. In response to determining to attempt the spatial reuse transmission, STA21 transmits an RTS packet 612 (e.g., a packet that includes an RTS frame) to AP2. Upon receiving the RTS packet 612, AP2 determines whether the communication channel is idle from the standpoint of AP2. If AP2 determines that the communication channel is idle from the standpoint of AP2 and responsive to the RTS packet 612, AP2 sends a CTS packet 612 (e.g., a packet that includes a CTS frame) to STA21 within a defined time period. On the other hand, if AP2 determines that the communication channel is not idle from the standpoint of AP2, AP2 does not send a CTS packet 612 (e.g., a packet that includes an RTS frame) to STA21.

If STA21 receives the CTS packet 612 within the defined time period, STA21 transmits the data packet 340 during the spatial reuse opportunity. On the other hand, if STA21 does not receive the CTS packet 612 within the defined time period, STA21 does not transmit the data packet 340.

Figure 7:
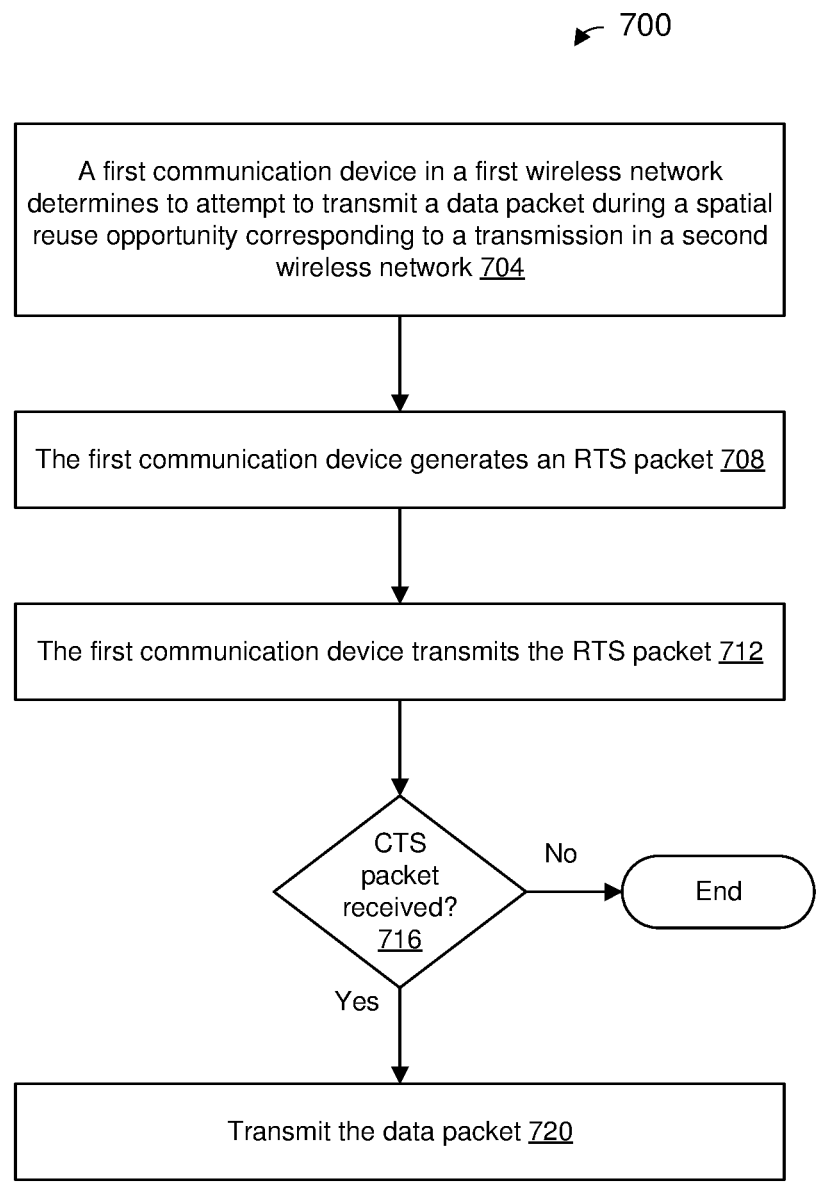
FIG. 7 is a flow diagram of an example method for selectively transmitting a data packet during a spatial reuse transmission opportunity, according to an embodiment.

FIG. 7 is a flow diagram of an example method 700 for selectively transmitting a data packet during a spatial reuse transmission opportunity, according to an embodiment. In some embodiments, the network interface device 162 of FIG. 1 is configured to implement the method 700, and the method 700 is described with reference to FIG. 1 merely for explanatory purposes. FIG. 7 is described also with reference to FIG. 6 merely for explanatory purposes. In other embodiments, however, the method 700 is implemented by another suitable device different than the example devices of FIG. 1 and/or in connection with other types of transmissions different that the example scenario depicted in FIG. 6. Similarly, in some embodiments, the network interface device 162 of FIG. 1 is not configured to implement the method 700.

At block 704, a first communication device (e.g., the network interface device 162 of FIG. 1, STA21 of FIG. 6) in a first wireless network (e.g., the network 110-1) determines to attempt to transmit a data packet during a spatial reuse opportunity corresponding to a transmission in a second wireless network. In an embodiment, block 704 includes determining a time period of the spatial reuse opportunity and/or a maximum transmit power that can be used during the spatial reuse opportunity using information (SRP parameter, duration, etc.) included in one or more transmissions in the second wireless network. For example, the first communication device uses a procedure, similar to the procedure discussed above with reference to FIG. 3, to determine a time duration of the spatial reuse opportunity and a maximum transmit power that can be used during the spatial reuse opportunity, according to an embodiment.

At block 708, the first communication device (e.g., the network interface device 162 of FIG. 1, STA21 of FIG. 6) generate an RTS packet (e.g., RTS packet 612, a PHY data unit that includes an RTS frame). At block 712, responsive to determining to attempt to transmit the data packet during the spatial reuse opportunity, the first communication device (e.g., the network interface device 162 of FIG. 1, STA21 of FIG. 6) transmits the RTS packet to a second communication device (e.g., AP2) in the first wireless network.

At block 716, the first communication device (e.g., the network interface device 162 of FIG. 1, STA21 of FIG. 6) determines whether the first communication device received a CTS packet (e.g., CTS packet 616, a PHY data unit that includes a CTS frame) responsive to the RTS packet transmitted at block 712. In an embodiment, block 716 includes determining whether the first communication device received the CTS packet within a defined time period after an end of transmission of the RTS packet.

If the first communication device (e.g., the network interface device 162 of FIG. 1, STA21 of FIG. 6) determines at block 716 that the CTS packet was received, the flow proceeds to block 720. At block 720, the first communication transmits the data packet during the spatial reuse opportunity, the data packet having been generated by the first communication device (e.g., the network interface device 162 of FIG. 1, STA21 of FIG. 6).

On the other hand, if the first communication device (e.g., the network interface device 162 of FIG. 1, STA21 of FIG. 6) determines at block 716 that the CTS packet was not received in response to the RTS packet transmitted at block 712, the flow ends without transmitting the data packet.

The method 700 is used in conjunction with one or more other methods described herein, in some embodiments. In other embodiments, however, the method 700 is used independently of the other methods described herein.

Referring again to FIG. 1, in some embodiments, the APs 114 and the client stations 154/194 employ a dynamic CCA procedure. With a dynamic CCA procedure, the AP/client station may use a higher threshold level for valid signals (e.g., signals having a PHY header that the AP/client station can properly decode) from another network (e.g., an OBSS) as compared to the threshold level for valid signals from the network to which the AP/client station belongs (e.g., the same BSS). For example, an AP/client station might deem a 20 MHz channel to be idle if the energy level of a valid signal from another network is less than −62 dBm (i.e., the same threshold level as for energy corresponding to signals that are not valid signals), but deem the channel to be busy if the energy level of a signal from the same network is greater than −82 dBm. Thus, an energy level of −70 dBm of a valid signal from a different network would result in the device determining that the channel is idle, whereas an energy level of −70 dBm a valid signal from the same network would result in the device determining that the channel is busy. Providing a higher signal power threshold for transmissions corresponding to another network helps to promote spatial reuse between different BSSs, at least in some embodiments and/or scenarios. The higher signal power thresholds are sometimes referred to herein as the "adjusted signal level thresholds", or "adjusted CCA levels".

In some embodiments, APs/client stations may use an adjusted CCA level that can be varied between a maximum level and a minimum level and can be set to a plurality of different values between the maximum level and the minimum level, such an adjusted CCA level is sometimes referred to as an "OBSS packet detection level", or an "OBSS_PD level". In some embodiments, the PHY processor 130 and/or the PHY processor 170 include circuitry for determining an energy level of signals on a channel medium, comparing the energy level to a threshold (e.g., an adjusted CCA level, an OBSS_PD level, etc.), and generating an output that indicates whether the energy level of signals on the channel medium meet the threshold.

Using OBSS_PD levels such as described above generally will lead to more SR transmissions. However, some SR transmissions in a BSS may interfere with or degrade data rates in an OBSS. Therefore, to reduce or mitigate degradation of transmissions in OBSSs, APs/client stations may lower transmit levels of SR transmissions in accordance with a value of the OBSS_PD level being used.

For example, an AP/client station sets a maximum transmit power according to the OBSS_PD level being used, according to an embodiment. Generally, as the OBSS_PD level is increased, the maximum transmit power that the AP/client station can use ($Tx\_Max\_Pwr_{OBSS\_PD}$) is decreased, and as the OBSS_PD level is decreased, $Tx\_Max\_Pwr_{OBSS\_PD}$ is increased.

Figure 8:
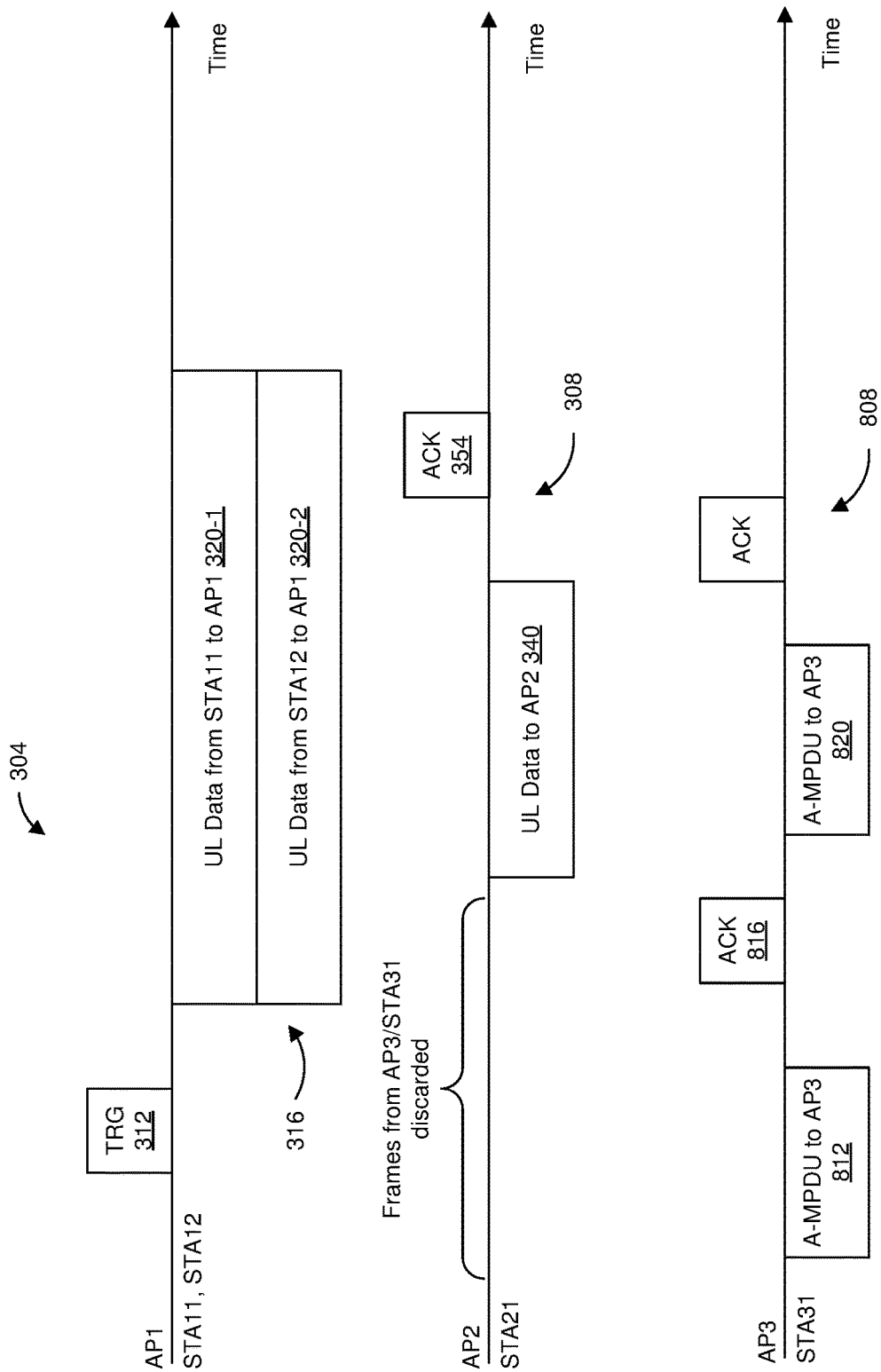
FIG. 8 is a timing diagram of example transmissions in a communication system similar to the communication system of FIG. 2, but including a third wireless network, according to an embodiment.

FIG. 8 is a timing diagram of transmissions in a system similar to the system 200 of FIG. 2, except the system of FIG. 8 includes a third wireless network, e.g., BSS3, which includes an access point AP3 and a client station STA31. The transmissions shown in FIG. 8 are similar to the transmissions shown in FIG. 3, and like-numbered elements are not discussed in detail for purpose of brevity. Transmissions 304 are made by communication devices in BSS1, transmissions 308 are made by communication devices in BSS2, and transmissions 808 are made by communication devices in BSS3.

In the example illustrated in FIG. 8, STA21 is using an OBSS_PD level and, packets 812 and 816 transmitted by AP3 and STA31 are received at STA21 at a level that is below the OBSS_PD level. As a result, when STA21 performs a CCA and backoff procedure prior to transmitting the packet 340, the STA21 determines that the channel medium is idle.

Additionally, as discussed above, STA21 determines a transmit power to use when transmitting the packet 340. For example, STA21 determines the transmit power using the SRP parameter in the UL transmission 316 in BSS1. However, if the transmit power determined using the SRP parameter in the UL transmission 316 in BSS1 is greater than $Tx\_Max\_PWr_{OBSS\_PD}$, transmission of the packet 340 may interfere with transmissions in BSS3, such as a packet 820 transmitted by STA31 to AP3.

Accordingly, in an embodiment, when a communication device determined to transmit a packet during a spatial reuse opportunity and when the communication device is using an OBSS_PD level, the communication device uses a transmit power that is less than or equal to $Tx\_Max\_Pwr_{OBSS\_PD}$. In some embodiments, this feature is combined with the method 400 of FIG. 4 and/or the method 700 of FIG. 7.

Some communication devices use a timer to monitor when a communication channel is being used by one or more other communication devices. For example, the IEEE 802.11 Standard defines a network allocation vector (NAV) that is set by a communication device upon receiving a packet from another communication device that includes duration information in a header of the packet, the duration information indicating a length of time that the other communication device will be using a channel medium. The NAV is decremented over time. When the NAV is non-zero, the communication device assumes that the other communication device is using the channel medium and will refrain from transmitting. When the NAV reaches zero, however, the communication device may attempt to transmit on the channel medium. Thus, some communication devices include a NAV timer circuit that implements the NAV as discussed above. In an embodiment, the NAV timer circuit is included in the MAC processor 126 and/or the MAC processor 166.

Figure 9:
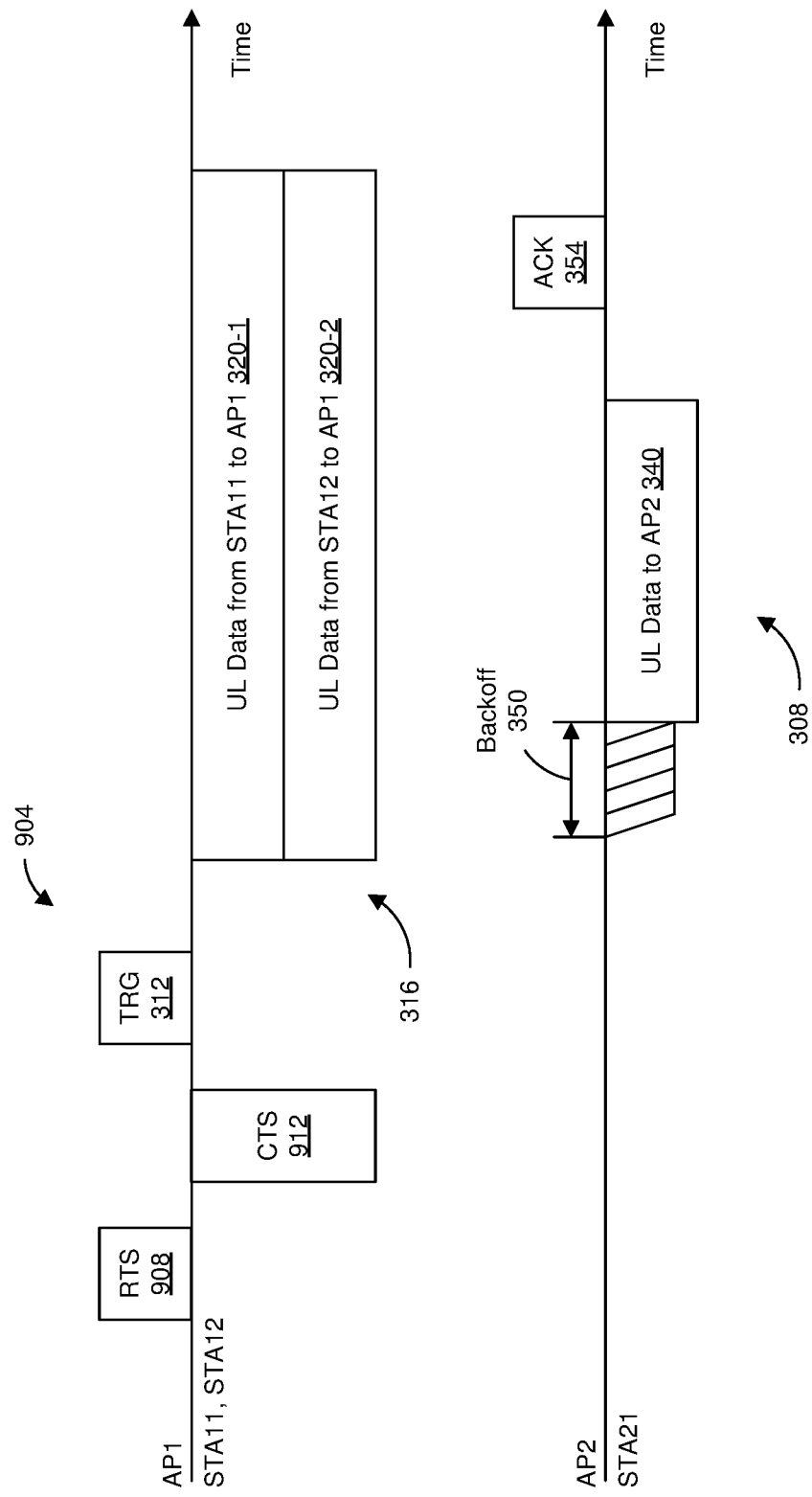
FIG. 9 is a timing diagram of example transmissions in the communication system of FIG. 2, according to an embodiment.

FIG. 9 is a timing diagram of transmissions in a system similar to the system 200 of FIG. 3. The transmissions shown in FIG. 9 are similar to the transmissions shown in FIG. 3, and like-numbered elements are not discussed in detail for purpose of brevity. Transmissions 904 are made by communication devices in BSS1, and transmissions 308 are made by communication devices in BSS2.

In the example of FIG. 9, AP1 transmits a multi-user RTS packet 908 prior to transmitting the trigger packet 312. Additionally, STA11 and STA12 transmit CTS packet(s) 912 responsive to the RTS packet 908 prior to AP1 transmitting the trigger packet 312. Upon receiving RTS packet 908, STA21 may set a NAV timer using duration information included in an RTS frame included in the RTS packet 908. Thus, upon receiving the trigger packet 312, STA21 may determine that the NAV timer is non-zero and thus decide that the spatial reuse transmission 340 cannot be performed. However, the RTS packet 908 and the CTS packet(s) 912 are transmitted merely in connection with the UL MU transmission 320, which otherwise provides a spatial reuse opportunity. Thus, the setting of the NAV timer responsive to RTS packet 908 provides a "false" busy indication for the channel medium.

Thus, in an embodiment, the STA21 (e.g., the network interface device 162), when setting a NAV timer in response to receiving a packet, also records information from the packet that indicates a network (e.g., a BSS) from which the packet originated. For example, in an embodiment, the STA21 (e.g., the network interface device 162) records one of, or any suitable combination of two or more of, a source address in a MAC header of the packet, a transmitter address in the MAC header, a BSS color in a PHY header of the packet, etc. When determining whether a spatial reuse transmission can be made during an UL MU transmission, and if the NAV timer is non-zero, the STA21 (e.g., the network interface device 162) compares i) information in the trigger packet that indicates a network (e.g., a BSS) from which the trigger packet originated with ii) the information recorded in connection with setting the NAV timer. For example, the STA21 (e.g., the network interface device 162) compares i) a source address or transmitter address in the trigger packet with ii) a MAC address recorded in connection with setting the NAV timer. As another example, the STA21 (e.g., the network interface device 162) compares i) a BSS color in the trigger packet with ii) a BSS color recorded in connection with setting the NAV timer.

If the information in the trigger packet that indicates a network that is the same as the network corresponding to the packet used to set the NAV timer, then the STA21 (e.g., the network interface device 162) ignores the non-zero NAV timer and goes forward with the spatial reuse transmission 340. On the other hand, if the information in the trigger packet that indicates a network that is different than the network corresponding to the packet used to set the NAV timer, then the STA21 (e.g., the network interface device 162) does not ignore the non-zero NAV timer and refrains from performing the spatial reuse transmission 340. For example, if a source address or transmitter address in the trigger packet is the same as a MAC address recorded in connection with setting the NAV timer, then the STA21 (e.g., the network interface device 162) ignores the non-zero NAV timer and goes forward with the spatial reuse transmission 340. On the other hand, if the source address or transmitter address in the trigger packet is not the same as the MAC address recorded in connection with setting the NAV timer, then the STA21 (e.g., the network interface device 162) does not ignore the non-zero NAV timer and refrains from performing the spatial reuse transmission 340.

As another example, if a BSS color in the trigger packet is the same as a BSS color recorded in connection with setting the NAV timer, then the STA21 (e.g., the network interface device 162) ignores the non-zero NAV timer and goes forward with the spatial reuse transmission 340. On the other hand, if the BSS color in the trigger packet is not the same as BSS color recorded in connection with setting the NAV timer, then the STA21 (e.g., the network interface device 162) does not ignore the non-zero NAV timer and refrains from performing the spatial reuse transmission 340.

In an embodiment, a method includes: determining, at a first communication device in a first wireless network, a transmit power for transmitting a first packet during a spatial reuse opportunity corresponding to a transmission in a second wireless network, wherein determining the transmit power includes using a spatial reuse parameter included in a second packet transmitted by a second communication device in the second wireless network, wherein the spatial reuse parameter is indicative of an acceptable interference level in the second wireless network; generating, at a first communication device, the first packet to include information to indicate to a third communication device that the third communication device should not transmit a third packet according to a normal acknowledgment procedure during the spatial reuse opportunity, wherein the third communication device is an intended receiver of the first packet, and wherein the third packet is an acknowledgment of the first packet; transmitting, by the first communication device, the first packet at the determined transmit power; and receiving, at the first communication device, the third packet from the third communication device, the third packet having not been transmitted according to the normal acknowledgment procedure during the spatial reuse opportunity.

In other embodiments, the method also includes one of, or any suitable combination of two or more of, the following features.

Generating the first packet to include information to indicate to the third communication device that the third communication device should not transmit the third packet according to the normal acknowledgment procedure during the spatial reuse opportunity includes generating the first packet to include information to indicate to the third communication device that the first packet is being transmitted during the spatial reuse opportunity.

Generating the first packet to include information to indicate to the third communication device that the third communication device should not transmit the third packet according to the normal acknowledgment procedure during the spatial reuse opportunity includes generating the first packet to include information to indicate to the third communication device that the first packet should be acknowledged using a block acknowledgment procedure and in response to a subsequent request transmitted by the first communication device.

The method further includes determining, at the first communication device, a dynamic energy threshold for detecting transmissions from other communication networks.

The method further includes determining, at the first communication device, a maximum transmit power level using the dynamic energy threshold.

Determining the transmit power for transmitting the first packet during the spatial reuse opportunity further includes setting the transmit power at or below the maximum transmit power level.

The method further includes determining, at the first communication device, whether a timer has expired, wherein the timer tracks the use of a communication medium by other communication devices.

Transmitting the first packet is responsive to determining that the timer has expired.

The method further includes receiving, at the first communication device, a fourth packet.

The method further includes responsive to receiving the fourth packet, setting, at the first communication device, a timer that tracks the use of a communication medium by other communication devices.

The method further includes receiving, at the first communication device, a fifth packet transmitted by a fourth communication device in the second wireless network, wherein the fifth packet includes a trigger frame that prompts the second communication device in the second wireless network to transmit the second packet.

The method further includes comparing, at the first communication device, an address of the fourth communication device with an address of the communication device that transmitted the fourth packet.

Transmitting the first packet occurs i) when the timer is not expired, and ii) the address of the fourth communication device is the same as the address of the communication device that transmitted the fourth packet.

The method further includes generating, at the first communication device, a request-to-send (RTS) packet.

The method further includes transmitting, by the first communication device, the RTS packet.

The method further includes determining, at the first communication device, whether the first communication device received a clear-to-send (CTS) packet in response to the RTS packet.

Transmitting the first packet is responsive to determining that the first communication device received the CTS packet in response to the RTS packet.

In another embodiment, an apparatus comprises a network interface device associated with a first communication device in a first wireless network. The network interface device includes one or more integrated circuits (ICs) configured to: determine a transmit power for transmitting a first packet during a spatial reuse opportunity corresponding to a transmission in a second wireless network, wherein determining the transmit power includes using a spatial reuse parameter included in a second packet transmitted by a second communication device in the second wireless network, wherein the spatial reuse parameter is indicative of an acceptable interference level in the second wireless network, generate the first packet to include information to indicate to a third communication device that the third communication device should not transmit a third packet according to a normal acknowledgment procedure during the spatial reuse opportunity, wherein the third communication device is an intended receiver of the first packet, and wherein the third packet is an acknowledgment of the first packet, transmit the first packet at the determined transmit power, and receive the third packet from the third communication device, the third packet having not been transmitted according to the normal acknowledgment procedure during the spatial reuse opportunity.

In other embodiments, the apparatus also comprises one of, or any suitable combination of two or more of, the following features.

The one or more ICs are configured to generate the first packet to include information to indicate to the third communication device that the first packet is being transmitted during the spatial reuse opportunity.

The one or more ICs are configured to generate the first packet to include information to indicate to the third communication device that the first packet should be acknowledged using a block acknowledgment procedure and in response to a subsequent request transmitted by the first communication device.

The one or more ICs are configured to determine a dynamic energy threshold for detecting transmissions from other communication networks;

The one or more ICs are configured determine a maximum transmit power level using the dynamic energy threshold.

The one or more ICs are configured set the transmit power for transmitting the first packet during the spatial reuse opportunity at or below the maximum transmit power level.

The network interface device includes a timer circuit implemented on the one or more ICs, the timer circuit being used by the network interface device to track the use of a communication medium by other communication devices.

The one or more ICs are configured to determine whether the timer has expired.

The one or more ICs are configured transmit the first packet when the timer has expired.

The network interface device includes i) a timer circuit implemented on the one or more ICs, the timer circuit being used by the network interface device to track the use of a communication medium by other communication devices, and ii) a memory implemented on the one or more ICs.

The one or more ICs are configured to receive a fourth packet.

The one or more ICs are configured to, responsive to receiving the fourth packet, i) set the timer circuit using duration information included in the fourth packet, and ii) store in the memory information in the fourth packet that indicates a wireless network from which the fourth packet originated.

The one or more ICs are configured receive a fifth packet transmitted by a fourth communication device in the second wireless network, wherein the fifth packet includes a trigger frame that prompts the second communication device in the second wireless network to transmit the second packet.

The one or more ICs are configured compare i) information in the fifth packet that indicates the fifth packet originated in the second wireless network with ii) the information in the fourth packet stored in the memory information that indicates the wireless network from which the fourth packet originated.

The one or more ICs are configured transmit the first packet when i) when the timer is not expired, and ii) the information in the fifth packet that indicates that the fifth packet originated in the same wireless network as the wireless network from which the fourth packet originated.

The one or more ICs are configured to generate a request-to-send (RTS) packet.

The one or more ICs are configured to transmit the RTS packet.

The one or more ICs are configured to determine whether the first communication device received a clear-to-send (CTS) packet in response to the RTS packet.

The one or more ICs are configured to transmit the first packet responsive to determining that the first communication device received the CTS packet in response to the RTS packet.

The network interface device includes a media access control layer (MAC) processor implemented on the one or more ICs.

The network interface device includes a physical layer (PHY) processor implemented on the one or more ICs, and coupled to the MAC processor.

The MAC processor is configured to generate a MAC data unit to include the information to indicate to the third communication device that the third communication device should not transmit the third packet according to the normal acknowledgment procedure.

The PHY processor is configured to generate the first packet to include the MAC data unit, wherein the first packet is a PHY data unit.

In still another embodiment, a method includes: receiving, at a first communication device in a first wireless network, a first packet from a second communication device in the first wireless network; determining, at the first communication device, that the first packet was transmitted during a spatial reuse opportunity corresponding to a transmission in a second wireless network; generating, at the first communication device, a second packet that is an acknowledgment of the first packet; and in response to determining that the first packet was transmitted during the spatial reuse opportunity corresponding to the transmission in the second wireless network, transmitting the second packet according to a procedure that is not a normal acknowledgment procedure, including at least one of: i) performing a clear channel assessment (CCA) procedure to determine whether a communication channel is idle, and transmitting the second packet responsive to determining that the communication channel is idle, and/or ii) transmitting the second packet at a transmit power that is lower than a normal transmit power.

In other embodiments, the method also includes one of, or any suitable combination of two or more of, the following features.

Determining that the first packet was transmitted during the spatial reuse opportunity corresponding to the transmission in the second wireless network includes analyzing a field in a header of the first packet that indicates the first packet was transmitted during the spatial reuse opportunity corresponding to the transmission in the second wireless network.

The method further includes determining, at the first communication device, the transmit power for transmitting the second packet including using a spatial reuse parameter included in a third packet transmitted by a third communication device in the second wireless network, wherein the spatial reuse parameter is indicative of an acceptable interference level in the second wireless network.

Transmitting the second packet according to the procedure that is not the normal acknowledgment procedure, includes transmitting the second packet at the transmit power determined using the spatial reuse parameter included in the third packet.

In yet another embodiment, an apparatus comprising a network interface device associated with a first communication device in a first wireless network. The network interface device includes one or more integrated circuits (ICs) configured to: receive a first packet from a second communication device in the first wireless network, determine that the first packet was transmitted during a spatial reuse opportunity corresponding to a transmission in a second wireless network, generate a second packet that is an acknowledgment of the first packet, and in response to determining that the first packet was transmitted during the spatial reuse opportunity corresponding to the transmission in the second wireless network, transmit the second packet according to a procedure that is not a normal acknowledgment procedure, including at least one of: i) performing a clear channel assessment (CCA) procedure to determine whether a communication channel is idle, and transmitting the second packet responsive to determining that the communication channel is idle, and/or ii) transmitting the second packet at a transmit power that is lower than a normal transmit power.

In other embodiments, the apparatus also comprises one of, or any suitable combination of two or more of, the following features.

The one or more ICs are configured to analyze a field in a header of the first packet that indicates the first packet was transmitted during the spatial reuse opportunity corresponding to the transmission in the second wireless network.

The one or more ICs are configured to use a spatial reuse parameter included in a third packet transmitted by a third communication device in the second wireless network to determine the transmit power for transmitting the second packet, wherein the spatial reuse parameter is indicative of an acceptable interference level in the second wireless network.

The one or more ICs are configured to transmit the second packet at the transmit power determined using the spatial reuse parameter included in the third packet.

The network interface device includes a media access control layer (MAC) processor implemented on the one or more ICs.

The network interface device includes a physical layer (PHY) processor implemented on the one or more ICs, and coupled to the MAC processor.

The MAC processor is configured to determine that the first packet was transmitted during a spatial reuse opportunity corresponding to a transmission in a second wireless network.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a first wireless communication network, the method comprising:
   setting, at a communication device in the first wireless communication network, a power threshold level to a value from among a set of different values that includes at least a maximum value and a minimum value, the power threshold level for use in determining whether a communication channel is idle, the power threshold level being set to a value that is above the minimum value;
   using, at the communication device, the power threshold level set to the value above the minimum value to determine whether the communication is idle;
   determining, at the communication device and while using the power threshold level set to the value above the minimum value to determine whether the communication is idle, that a transmission is to be performed during a spatial reuse opportunity corresponding to a transmission in a second wireless communication network;
   determining, at the communication device, a transmit power to use for transmission during the spatial reuse opportunity, the transmit power being determined using the power threshold level set to the value above the minimum value; and
   transmitting, by the communication device, a packet during the spatial reuse opportunity at the transmit power that was determined using the power threshold level set to the value above the minimum value.

2. The method of claim 1, wherein determining the transmit power comprises:
   using the power threshold level set to the value above the minimum value to determine a maximum transmit power; and
   determining the transmit power to be less than or equal to the maximum transmit power.

3. The method of claim 1, wherein:
   the packet is a first packet;
   the method further comprises receiving, at the first communication device, a second packet transmitted in the second wireless network, the second packet including a spatial reuse parameter that is indicative of an acceptable interference level in the second wireless network; and
   determining the transmit power to use for transmission during the spatial reuse opportunity includes further using the spatial reuse parameter that is indicative of an acceptable interference level in the second wireless network to determine the transmit power.

4. The method of claim 3, further comprising:
   retrieving the spatial reuse parameter from a trigger frame within the second packet, the trigger frame transmitted by an access point of the second wireless network to prompt one or more other communication devices in the second wireless communication network to transmit to the access point;

wherein transmitting the first packet during the spatial reuse opportunity includes transmitting the first packet while the one or more other communication devices in the second wireless network transmit in response to the trigger frame.

5. The method of claim 4, wherein:
using the power threshold level set to the value above the minimum value to determine whether the communication is idle comprises decrementing a backoff counter in response to determining that comparing energy detected in the communication channel is less than the power threshold level set to the value above the minimum value; and
transmitting the first packet during the spatial reuse opportunity includes transmitting the first packet after the backoff counter reaches zero.

6. The method of claim 1, wherein using the power threshold level set to the value above the minimum value to determine whether the communication is idle comprises:
performing a clear channel assessment (CCA) procedure using the power threshold level set to the value above the minimum value.

7. The method of claim 1, further comprising:
generating the packet to include information to indicate to another communication device that the packet is being transmitted during a spatial reuse opportunity.

8. The method of claim 1, further comprising:
generating the packet to include information to indicate to another communication device that an acknowledgment packet is to be transmitted at a particular transmit power, the acknowledgment packet acknowledging receipt of the packet.

9. The method of claim 1, further comprising:
generating the packet to include information to indicate to another communication device that the packet is to be acknowledged in response to a subsequent request transmitted by the communication device.

10. A communication device for communicating in a first wireless communication network, the communication device comprising:
a wireless network interface device including one or more integrated circuit (IC) devices and one or more transceivers implemented on the one or more IC devices, the one or more IC devices configured to:
set a power threshold level to a value from among a set of different values that includes at least a maximum value and a minimum value, the power threshold level for use in determining whether a communication channel is idle, the power threshold level being set to a value that is above the minimum value,
use the power threshold level set to the value above the minimum value to determine whether the communication is idle,
determine, while using the power threshold level set to the value above the minimum value to determine whether the communication is idle, that a transmission is to be performed during a spatial reuse opportunity corresponding to a transmission in a second wireless communication network,
determine a transmit power to use for transmission during the spatial reuse opportunity, the transmit power being determined using the power threshold level set to the value above the minimum value, and
control the one or more transceivers to transmit a packet during the spatial reuse opportunity at the transmit power that was determined using the power threshold level set to the value above the minimum value.

11. The communication device of claim 10, wherein the one or more IC devices are further configured to:
use the power threshold level set to the value above the minimum value to determine a maximum transmit power; and
determine the transmit power to be less than or equal to the maximum transmit power.

12. The communication device of claim 10, wherein:
the packet is a first packet; and
the one or more IC devices are further configured to:
further use a spatial reuse parameter to determine the transmit power to use for transmission during the spatial reuse opportunity, the spatial reuse parameter within a second packet that was transmitted in the second wireless network and received by the wireless network interface device, the spatial reuse parameter indicative of an acceptable interference level in the second wireless network.

13. The communication device of claim 12, wherein the one or more IC devices are further configured to:
retrieve the spatial reuse parameter from a trigger frame within the second packet, the trigger frame transmitted by an access point of the second wireless network to prompt one or more other communication devices in the second wireless communication network to transmit to the access point; and
control the one or more transceivers to transmit the first packet while the one or more other communication devices in the second wireless network transmit in response to the trigger frame.

14. The communication device of claim 13, wherein:
the wireless network interface device comprises a backoff counter implemented on the one or more IC devices; and
the one or more IC devices are further configured to:
decrement the backoff counter in response to determining that energy detected in the communication channel is less than the power threshold level set to the value above the minimum value, and
prompt the one or more transceivers to transmit the first packet after the backoff counter reaches zero.

15. The communication device of claim 10, wherein the one or more IC devices are further configured to:
perform a clear channel assessment (CCA) procedure using the power threshold level set to the value above the minimum value.

16. The communication device of claim 10, wherein the one or more IC devices are further configured to:
generate the packet to include information to indicate to another communication device that the packet is being transmitted during a spatial reuse opportunity.

17. The communication device of claim 10, wherein the one or more IC devices are further configured to:
generate the packet to include information to indicate to another communication device that an acknowledgment packet is to be transmitted at a particular transmit power, the acknowledgment packet acknowledging receipt of the packet.

18. The communication device of claim 10, wherein the one or more IC devices are further configured to:
generate the packet to include information to indicate to another communication device that the packet is to be acknowledged in response to a subsequent request transmitted by the communication device.

19. The communication device of claim 10, wherein the wireless network interface device further comprises:
- a media access control layer (MAC) processor implemented on the one or more IC devices; and
- a physical layer (PHY) processor implemented on the one or more IC devices, and coupled to the MAC processor; and
- wherein the PHY processor is configured to control the one or more transceivers to transmit the packet during the spatial reuse opportunity.

20. The communication device of claim 10, further comprising:
- one or more antennas coupled to the one or more transceivers.

* * * * *